United States Patent
Dotan-Cohen et al.

(10) Patent No.: US 11,206,223 B2
(45) Date of Patent: Dec. 21, 2021

(54) SIGNAL UPLOAD OPTIMIZATION

(71) Applicant: MICROSOFT TECHNOLOGY LICENSING, LLC, Redmond, WA (US)

(72) Inventors: Dikla Dotan-Cohen, Herzliya (IL); Ido Priness, Herzliya (IL); Haim Somech, Ramat Gan (IL); Lilach Perry, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 15/624,993

(22) Filed: Jun. 16, 2017

(65) Prior Publication Data

US 2018/0006967 A1   Jan. 4, 2018

Related U.S. Application Data

(60) Provisional application No. 62/357,172, filed on Jun. 30, 2016.

(51) Int. Cl.
*G06F 15/173* (2006.01)
*H04L 12/911* (2013.01)
(Continued)

(52) U.S. Cl.
CPC .............. *H04L 47/821* (2013.01); *G06F 9/54* (2013.01); *H04L 67/22* (2013.01); *H04L 67/303* (2013.01); *H04L 67/306* (2013.01); *H04L 67/32* (2013.01)

(58) Field of Classification Search
CPC ............................ H04L 47/821; H04L 67/303
See application file for complete search history.

(56) References Cited

U.S. PATENT DOCUMENTS 8,121,585 B2 *  2/2012  Commarford ...... H04L 67/1095
                                                              455/418
8,812,419 B1    8/2014  Teller et al.
(Continued)

FOREIGN PATENT DOCUMENTS

CN         1419774 A      5/2003
CN       101621541 A      1/2010
(Continued)

OTHER PUBLICATIONS

AARP, "Walking Techniques to Keep Up the Pace", Jun. 8, 2007, Health, https://www.aarp.org/health/fitness/info-2007/walking_techniques_to_keep_up_the_pace.html, all pages.*
(Continued)

*Primary Examiner* — Hua Fan
(74) *Attorney, Agent, or Firm* — Rainier Patents, P.S.

(57) ABSTRACT

Aspects of the technology described herein allocate limited computing resources, such as available bandwidth and battery power, to transferring the most urgent and important data from a client device to an online service. Client devices have enormous amounts of information about the user's activities that could be communicated to the service at any given time. However, the wireless transfer of information uses available battery power and can consume a user's data plan. The technology described herein uses a model to determine how often information should be sent to a service. The model can also determine what information to send. Different models can be implemented in different scenarios. The different models can include different weighting that will produce different decisions given the same inputs.

22 Claims, 6 Drawing Sheets

(51) Int. Cl.
*H04L 29/08* (2006.01)
*G06F 9/54* (2006.01)

(56) References Cited

U.S. PATENT DOCUMENTS

| | | | |
|---|---|---|---|
| 8,983,412 B2 | 3/2015 | Featherstone et al. | |
| 2004/0128151 A1 | 7/2004 | Mock et al. | |
| 2005/0147190 A1 | 7/2005 | Nishikawa | |
| 2006/0276962 A1* | 12/2006 | Yoshioka | G09B 29/007 701/520 |
| 2008/0062893 A1* | 3/2008 | Bloebaum | H04L 12/66 370/260 |
| 2008/0319845 A1* | 12/2008 | Adkins | G06Q 30/02 705/14.27 |
| 2009/0181649 A1 | 7/2009 | Bull et al. | |
| 2012/0089727 A1 | 4/2012 | Raleigh et al. | |
| 2012/0131155 A1 | 5/2012 | Madey et al. | |
| 2014/0282857 A1 | 9/2014 | White et al. | |
| 2015/0050922 A1 | 2/2015 | Ramalingam et al. | |
| 2015/0142980 A1 | 5/2015 | Bragg et al. | |
| 2015/0262208 A1 | 9/2015 | Bjontegard | |
| 2015/0269151 A1 | 9/2015 | Wallace | |

FOREIGN PATENT DOCUMENTS

| | | | |
|---|---|---|---|
| CN | 101694629 A | 4/2010 | |
| CN | 102365630 A | 2/2012 | |
| CN | 103095490 A | 5/2013 | |
| CN | 103416078 A | 11/2013 | |
| CN | 105531979 A | 4/2016 | |
| KR | 20060127647 A | 12/2006 | |
| KR | 20130021729 A | 3/2013 | |
| WO | 2012117151 A1 | 9/2012 | |
| WO | 2016090193 A1 | 6/2016 | |

OTHER PUBLICATIONS

"International Search Report and Written Opinion Issued in PCT Application No. PCT/US2017/039182", dated: Sep. 25, 2017, 12 Pages.

Chun, et al., "Augmented Smartphone Applications through Clone Cloud Execution", In Proceedings of the 12th conference on hot topics in operating systems, May 18, 2009, 10 pages.

"Office Action Issued in European Patent Application No. 17736847.9", dated: Jan. 27, 2020, 8 Pages.

"Summons to Attend Oral Proceedings issued in European Patent Application No. 17736847.9", dated: Mar. 22, 2021, 11 Pages.

"First Office and Search Report Issued in Chinese Patent Application No. 201780038011.0", dated: May 8, 2021, 28 Pages.

Habak, et al., "FemtoClouds: Leveraging Mobile Devices to Provide Cloud Service at the Edge", In Proceedings of IEEE 8th International Conference on Cloud Computing, Jun. 27, 2015, 8 Pages.

Jingjing, et al., "Context and Role Based Access Control for Cloud Computing", In Journal of Computer Applications, vol. 35, Issue 2, Feb. 10, 2015, pp. 393-396.

\* cited by examiner

SIGNAL UPLOAD OPTIMIZATION

CROSS-REFERENCE TO RELATED APPLICATIONS

This application claims the benefit of U.S. Provisional Application No. 62/357,172, filed Jun. 30, 2016, entitled "SIGNAL UPLOAD OPTIMIZATION," the entirety of which is herein incorporated by reference.

BACKGROUND

Cloud-based services can utilize personal contextual information (e.g., web browsing, location data, calendar entries, communication data) provided by client devices to enable various user experiences on the client. For example, a service could analyze contextual data to provide a notification regarding an upcoming trip, nearby friends, or other information relevant to a user-experience. The transfer of contextual information uses available bandwidth and battery power when the device is not "plugged-in." Much of the contextual information may not be relevant to an available user-experience.

SUMMARY

This Summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Aspects of the technology described herein allocate limited computing resources, such as available bandwidth and battery power, to transferring the most urgent and important data from a client device to an online service. Many online services rely on contextual information about a user and/or a user device to provide a service to the user. For example, a traffic notification service needs to know the user's location to provide a commute estimate along with relevant traffic information. An online personal assistant may require calendar information and/or data from email to help the user complete one or more tasks on time.

Client devices have enormous amounts of information about the user's activities that could be communicated to the service at any given time. However, the wireless transfer of information uses available battery power and can consume a user's data plan. The technology described herein uses a model to determine how often information should be sent to a service. The model can also determine what information to send. Different models can be implemented in different scenarios. The different models can include different weighting that will produce different decisions given the same inputs. For example, in a "running late" scenario, location information may be communicated more frequently to help determine whether the user is back on schedule and to provide tips/reminders that help the user recover. Similarly, an "on vacation" scenario may cause more information to be shared because the user's actions and needs will be less predictable than if the user was in a "typical work day" scenario.

BRIEF DESCRIPTION OF THE DRAWINGS

The technology described herein is illustrated by way of example and not limitation in the accompanying figures in which like reference numerals indicate similar elements and in which.

DETAILED DESCRIPTION

Figure 1:
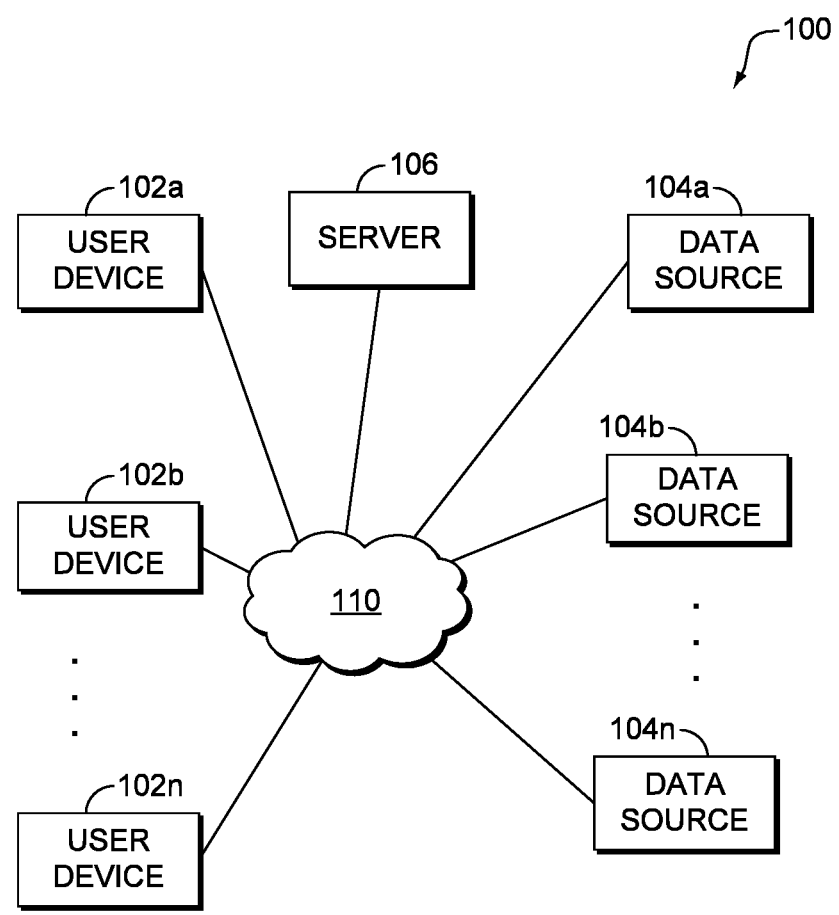
FIG. 1 is a block diagram of an example operating environment suitable for implementations of the present disclosure.

The various technology described herein is set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein allocates limited computing resources, such as available bandwidth and battery power, to transferring the most urgent and important data from a client device to an online service. Many online services rely on contextual information about a user and/or a user device to provide a service to the user. For example, a traffic notification service needs to know the user's location to provide a commute estimate along with relevant traffic information. An online personal assistant may require calendar information and/or data from email to help the user complete one or more tasks on time.

Client devices have enormous amounts of information about the user's activities that could be communicated to the service at any given time. However, the wireless transfer of information uses available battery power and can consume a user's data plan. The technology described herein uses a model to determine how often information should be sent to a service. The model can also determine what information to send. Different models can be implemented in different scenarios. The different models can include different weighting that will produce different decisions given the same inputs. For example, in a "running late" scenario, location information may be communicated more frequently to help determine whether the user is back on schedule and to provide tips/reminders that help the user recover. Similarly, an "on vacation" scenario may cause more information to be shared because the user's actions and needs will be less predictable than if the user was in a "typical work day" scenario.

The technology described herein may use contextual signals to determine whether the same contextual signals or other contextual signals should be communicated. "Contextual signals," as utilized herein, may reflect any attribute of a user (for instance, physical characteristics), the user's historical interaction with the system (e.g., behavior, habits, and system interaction patterns), and/or the user's recent interaction with the system (with "recency" being defined in accordance with a predetermined time frame relative to a given point in time) that may affect the likelihood or probability that the user desires to engage with a particular computer application or computer program. Such contextual signals may include, by way of example only and not limitation, the location of the user of the computing device (determined utilizing, for instance, Global Positioning System (GPS) signals, Internet Protocol (IP) address, or the like), the time of day (either general (for instance, morning or afternoon) or exact (for instance, 6:00 pm)), the date (either exact or a particular month, season, etc.), a physical characteristic of the user (for instance, if the user is paralyzed and capable of only voice input, or the like), a task currently engaged in on the computing device by the user, a task recently engaged in on the computing device by the user (again with "recency" being defined in accordance with a predetermined time frame relative to a given point in time), an object the user is currently engaged with on the computing device (for instance, an entity such as a contact, a file, an image, or the like), an object the user was recently engaged with on the computing device, a function currently being performed by the user on the computing device, a function recently performed by the user on the computing device, hardware currently being utilized on the computing device, hardware recently utilized on the computing device, software currently being utilized on the computing device, and software recently utilized on the computing device. The contextual signals can also include calendar entries, emails, texts, social network interactions and communications, and derivatives or meta data from all of the above. An example derivative could be a snippet from an email that describes an upcoming meeting, instead of the entire email. Another example could be a conclusion drawn from the email, such as Bob will late to the meeting.

While contextual data of all sorts may be described as being transferred between the client device and one or more online services, it should be noted that all such transfers may be subject to various privacy policies the user has been made aware of and either agreed to or opted out of. Aspects the technology described herein are not dependent on transferring or having the ability to transfer all the different types of information described. Privacy policies and other considerations can be implemented to define what types of information the technology described herein can share. It should also be noted, that the online service can take steps, not described herein, to protect any data received.

In one aspect, user data is transmitted with a default frequency and default content definition absent other determinations that adjust the default frequency and definition. The frequency of transmission defines how often transmissions occur. The content definition is used to select content for transmission given the context. A series of determinations can be made to adjust the default settings to scenario specific settings. The determinations can cause adjustments in isolation or in combination. In one aspect, the determinations have a hierarchy that allows some determinations to override or influence others.

In one aspect, the first determination is a device context determination. The device context could be assigned a profile defined by various device characteristics. For example, a series of profiles may be relevant when the client device is running on battery power. Different profiles can be based on different levels of energy remaining in the battery. Another set of profiles, could be based on whether an active data link over which user data will be transmitted has a data quota. More granular profiles could be based on an amount of data left in the quota. As an example, when a device context profile that is associated with a reduced frequency of transmission is active, the default frequency of user data transmission will be reduced to what can be described as a device-context-specific transmission rate. The content definition could be adjusted in a similar fashion to transmit less content with each transmission. The definition is adjusted to make sure the most important or urgent user data is transmitted.

A second determination can be based on user context. As an example, a user context could indicate that the user is out of routine. When the user is out of routine, one or more services enabled by the provision of user data could be of significant benefit to the user. As with the device context, user data can be evaluated to assign a user context profile to the user at a point in time. The profile can dictate whether the active transmission frequency is increased or decreased. The increase or decrease can be by a discrete amount or percentage.

When a first determination and a second determination are combined the final transmission frequency could be influenced by both. In another aspect, a determination resets the transmission frequency and content definition according to a rule without regard to other determinations.

In one aspect, scenario specific models can be used adjust the frequency of transmission and the content definition. A regular model can be used when no scenario specific model is activated. Whether the regular model or various scenario-specific models is active, can result in different transmission frequencies and content transmissions. For example, a scenario specific model related to a user running late for an event could result in more frequent transmission of data than the regular model.

In aspects, the content definition can be adjusted according to an expected gain sharing certain user information with a service will have to the user. Various services can be enabled when information is shared with them. The gain can be based on whether the user is likely to value a service that could be provided and the impact information will have on the quality of the service provided. The likely value a service could have to a user can be determined by a user's previous interactions or use of that specific service. If the user's interactions indicate that the service is appreciated by the user, for example, responding directly to communications related to the service, such as a task reminder, then the service could be deemed valuable. On the other hand, if communications related to the service are routinely ignored then the service may be deemed to have a low value to the particular user.

The value a specific piece of information has to the service can be determined by comparing a type of information the service needs with the amount of information of that type that the service currently possesses. A high-value could be placed on information of a type if the service currently has little or no information of the type. High-value could also be placed on the information if the new information is significantly different from previous information of the same type sent to the service. For example, new location information that differs significantly from the user's previous location could have high-value.

The content definition could also be adjusted according to an urgency assigned to certain user data. In one aspect, each piece of user data is assigned an urgency. The urgency could be based on the information's relationship with an upcoming event, task, or other active scenario with a short timeframe. The perceived importance of the task or event can also be a factor in the urgency as described subsequently. But as an example, information about an unimportant event occurring in the near future may be deemed non-urgent.

Having briefly described an overview of aspects of the technology described herein, an exemplary operating environment in which aspects of the technology described herein may be implemented is described below in order to provide a general context for various aspects. Referring to the figures in general and initially to FIG. 1 in particular, an exemplary operating environment for implementing technology described herein is shown and designated generally as exemplary operating environment 100. The exemplary operating environment 100 is but one example of a suitable computing environment and is not intended to suggest any limitation as to the scope of use or functionality of aspects of the technology described herein. Neither should the exemplary operating environment 100 be interpreted as having any dependency or requirement relating to any one component nor any combination of components illustrated.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n can be client devices on the client-side of operating environment 100, while server 106 can be on the server-side of operating environment 100. The user devices can facilitate the completion of tasks and make a record of user activities. The user activities can be a source of contextual data that may be used by a service on server 106. Server 106 can comprise server-side software designed to work in conjunction with client-side software on user devices 102a and 102b through 102n so as to implement any combination of the features and functionalities discussed in the present disclosure. For example, the server 106 a personal assistant application that works in conjunction with a client-side application. The server 106 may receive activity records, such as physiological data, email data, calendar data, and location data, from the user devices. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 6 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one aspect, one or more data sources 104a through 104n provide (or make available for accessing) user data to user-data collection component 261 of FIG. 2.) Data sources 104a and 104b through 104n may be discrete from user devices 102a and 102b through 102n and server 106 or may be incorporated and/or integrated into at least one of those components. In one aspect, one or more of data sources 104a though 104n comprise one or more sensors, which may be integrated into or associated with one or more of the user device(s) 102a, 102b, or 102n or server 106. Examples of sensed user data made available by data sources 104a though 104n are described further in connection to user-data collection component 261 of FIG. 2. The data sources 104a though 104n can comprise a knowledge base that stores information about a venue, a user, an event, traffic information, weather information, social network data, including a social graph for a user, or other entity related to a particular user action. The data sources 104a though 104n can comprise enterprise data, such as an organization chart, that can be used to help understand relationships between people the user is corresponding with.

Figure 2:
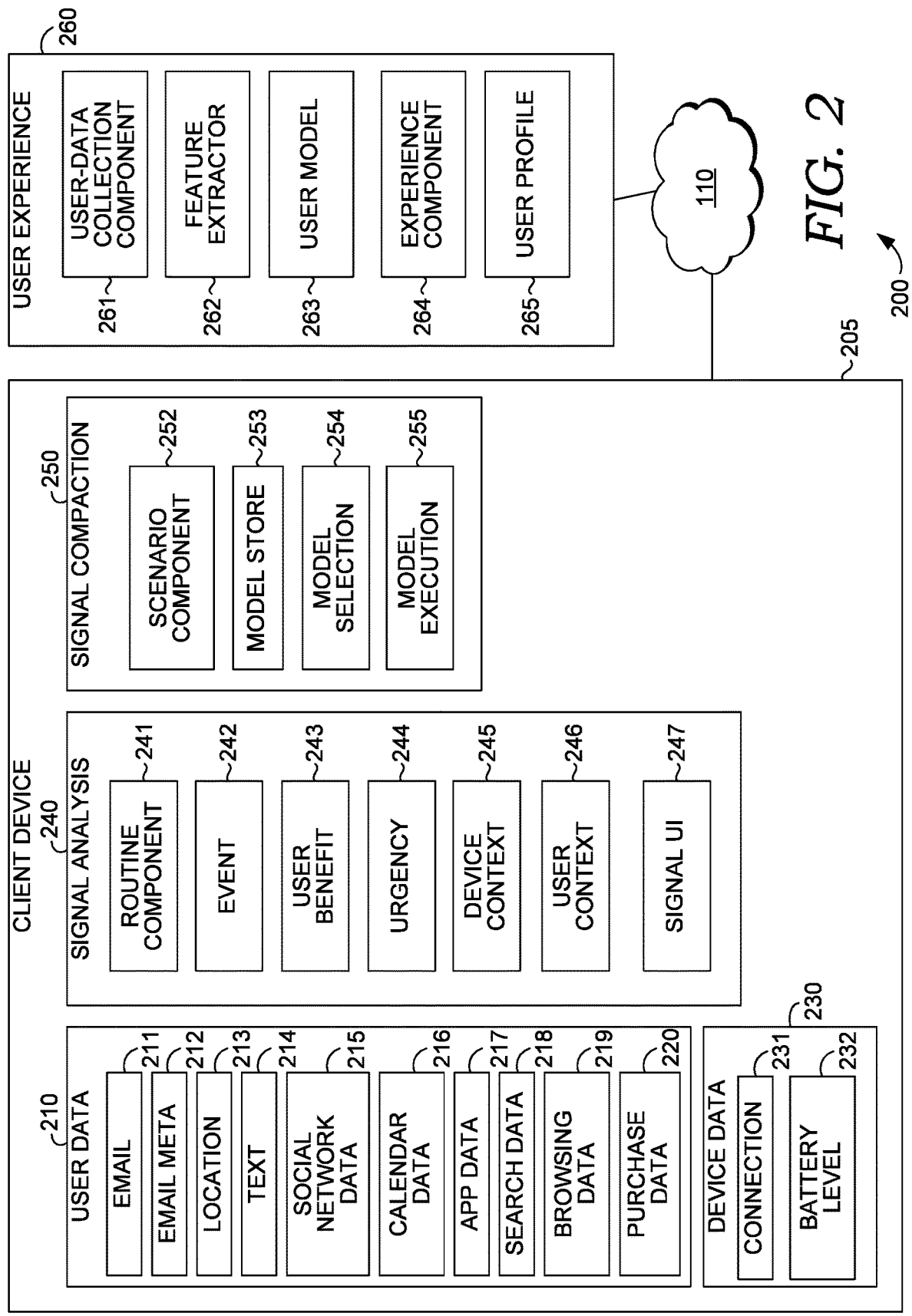
FIG. 2 is a diagram depicting an example computing architecture suitable for implementing aspects of the present disclosure.

Operating environment 100 can be utilized to implement one or more of the components of system 200, described in FIG. 2, including components for collecting user data, identifying urgent data, identifying various ongoing scenarios, inferring event patterns, make in-routine and out-of-routine decisions and ultimately determine what, if any contextual information, to communicate at a point in time.

Referring now to FIG. 2, with FIG. 1, a block diagram is provided showing aspects of an example computing system architecture suitable for implementing an embodiment of the technology described herein and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including client device 205 and user-experience component 260. Client device 205 (including its components 211, 212, 213, 214, 215, 216, 217, 218, 219, 220, 230, 231, 232, 240, 241, 242, 243, 244, 245, 246, 247, 250, 251, 252, 253, 254, and 255) and user-experience component 260 (including its components 261, 262, 263, 264, and 265) may be embodied as a set of compiled computer instructions or functions, program modules, computer software services, or an arrangement of processes carried out on one or more computer systems, such as computing device 600 described in connection to FIG. 6, for example.

In one embodiment, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Aspects of the technology determine what user data 210 is shared with the user-data collection component 261 and when it is shared. The information could be shared with any other device, such as the user's PC or tablet. The user-experience component 260 is used as an example of a device that could receive information from the client device 205.

The user data 210 can be collected by a personal assistant or some other data collection component on the client device 205. User data is one type of contextual data. Exemplary user data 210 includes email data 211, email metadata 212, location data 213, text message data 214, social network data 215, calendar data 216, application data 217, search data 218, browsing data 219, and purchase data 220. Aspects of the technology described herein are not limited for use with this data. Other contextual data, including data records derived from this data could be shared. Drive data includes any data that is output from an analysis of signal data to make an inference or direct observation about a user's activities. For example, physiological data and location data could be combined to infer that the user is exercising. As another example, location data and purchase data could be combined to infer that the user is watching a particular movie at the present time in a specific theater. Such inferences can be made on a client device and recorded for transfer to other devices.

The email data 211 can include the text of emails received on the client device to one or more applications. The emails could be associated with one or more user accounts. In addition, the other recipients and center of the email can be identified in the email records. Other information about the email, such as the time sent and received can be included in the email data 211.

The email metadata 212 can include information about the email records. The email metadata 212 can include snippets of email text that are relevant for a particular purpose. For example, a heuristic or natural language processing system could identify text within an email message that is relevant to one or more events the user is associated with. The text could also include requests of the user and promises made by the user. Such requests and promises or commitments can be used to populate a shadow calendar, a task list, or otherwise generate event data for a user.

Location data 213 can be gathered by GPS or some other technology on the client device 205. Location data 213 indicates where the user, or at least the client device 205, is located.

The text message data 214 can comprise similar information as was described previously with reference to the email data 211 and the email metadata 212, except the text message data 214 is related to text messages sent and received by the user. The text message data 214 can include the content of a text as well as sender and recipient information. As with emails, insights derived from analyzing a text message are a type of text message data.

The social network data 215 can include information about social posts made to one or more social networks or platforms. The information can include information about social posts read by a user, received by a user from a follower, and a user's interactions with a social post. For example, the social network data can include likes, dislikes, forwards, and other interactions with social network data and social posts. The addition or subtraction of individuals from the user's social networks can also be noted within the social network data 215.

The calendar data 216 can comprise information from one or more user calendars, such as office calendars, personal calendars, social media calendars, or even calendars from family members or friends of the user, in some instances. Some embodiments of the invention may construct a complementary or shadow calendar for a user. In particular, in such embodiments, the complementary or shadow calendar maybe used for determining when an event will occur and whether information related to the event may be urgent and/or important.

In an embodiment, the complementary calendar may be constructed based upon sensor data associated with a user of the client device 205. For example, a social network profile (e.g., social network posts, social network messages, a user profile indicating hobbies or interest of the users, etc.) may be evaluated to identify an activity of the user as a particular sensor data. In another example, a context of the user's device may be evaluated to identify an activity of the user as the sensor data (e.g., a device location may be indicative of the user going to soccer practice at a soccer field on Tuesdays; a device location check-in may be indicative of the user going out on a movie date on Sundays (e.g., the user may check-in through a social network); a connectivity state, such as Wi-Fi connectivity, may indicate that the user is at home, in the office, or at a coffee shop; a charging state, such as a car charging state, may indicate that the user is currently driving; a vacation itinerary file on the device may indicate that the user will be going on a vacation in a week; etc.).

It may be appreciated that, in some aspects, a wide variety of information, such as temporal information and/or locational information, may be evaluated to identify sensor data and/or supplement sensor data (e.g., a user's primary calendar may be used to identify conflicts and/or verify activities derived from sensor data; sensor data may be evaluated against real-time data. such as traffic information, weather, or supplemental information, which may include information from the user's social media accounts, family or friends social media accounts, email, news, and other user data (e.g. crowd-sourced data). In this way, the complementary calendar may be constructed with one or more entries derived from sensor data (e.g., automatically generated entries based upon inferred activities). In an embodiment, a complementary calendar may be merged with one or more calendars (e.g., the user's primary calendar, a family calendar, a social network calendar, etc.) to create a shadow calendar comprising at least some of the complementary calendar (e.g., automatically generated entries derived/inferred from sensor data) and at least some of the one or more calendars (e.g., user entries populated within the primary calendar by the user). As used herein, calendar data can be data taken from a complementary calendar or an actual user calendar.

The application data 217 can include information about the applications the user is interacting with or has open. When available, information received from or input to the various applications can also be included in the application data 217. The application data 217 can include a list of media the user has consumed, such as songs listened to along with information about when the user listened to individual songs. In one aspect, information about areas the user was viewing on a navigation or map application can be included within the application data 217.

The search data 218 can include information entered into a search query of a publicly available search engine. The results and interactions with those results can also be included in the search data 218. The search data 218 can also include information requested through a search function integrated into the client device 205. A personal assistant is one example of an application that has search functionality. In such a case, requests made of a personal assistant and answers provided in response to those requests could be included within the search data 218.

The browsing data 219 includes information about webpages the user navigated to through one or more browser applications. In this sense, the browsing data 219 is a special case of the application data 217.

The purchase data 220 could reflect purchases made through applications or through one or more webpages. In one instance, the application is a credit card or other payment application associated with the client device 205. For example, some client devices include technology that allows people to pay for goods or services using the client device 205.

In order to determine what information should be shared and when it should be shared, contextual information about the device can be accessed. The device data store 230 collects contextual information about the device state and provides this information or makes the information available to the signal analysis component 240 in the signal compaction component 250. The contextual device information can include which communication connections 231 are currently active. Exemplary communication connections include Wi-Fi connections, Bluetooth connections, 3G, 4G, LTE, and other cellular connections. Various wired connections, such as Ethernet connection, could be detected.

The battery level data 232 provides an indication of how much charge is left in the battery. The battery level data 232 can also include power usage rates that can be used to calculate how much battery life remains at the current usage rate. The battery level data 232 can be an important constituent of the signal compaction decision. For example, if a large amount of battery life remains and the user is expected to be in a location where the user can charge the client device 205 relatively soon, then more data could be sent sooner. On the other hand, if the client device 205 is running low on battery power and the user is not expected to be at a location where the client device 205 can be recharged, then less data should be shared.

Other contextual device information, not shown, can include a running total of the user's data quota. The running total can be daily, monthly, weekly, or some other unit. The plug-in status of the client device is another example of contextual device information. The device is plugged in when it is receiving power from an external source such as a power outlet in a home or vehicle. The device's location can be both user contextual data and device contextual data. The applications currently running on the client device 205 is another example of contextual device data.

The signal analysis component 240 includes a group of submodules that each analyze user data 210 and/or device data 230 to generate derivative data. The signal analysis component 240 includes a routine component 241, an event component 242 component, a user-benefit component 243, an urgency component 244, a device-context component 245, a user-context component 246, and a signal user-interface component 247. Each of these components can be thought of as layers that can analyze user data in combination with other information, such as a store records and established patterns to make determinations that can be fed into the signal compaction component 250. When information is not available for one of the signal analysis component 240 to make a determination, the compaction decision can be made without input from an individual component layer.

The event component 242 can associate user data with one or more events, track upcoming events, and record previously completed events. Event data compiled by the event component 242 can be used by other components to make decisions. For example, an event pattern determined by an analysis of similar features in reoccurring events could be used to determine a routine.

The term "event" is used broadly herein to include communication events, which refers to nearly any communication received or initiated by a computing device associated with a user including attempted communications (e.g., missed calls), communication intended for the user, initiated on behalf of the user, or available for the user. The term "event" may also refer to a reminder, task, announcement, or news item (including news relevant to the user such as local or regional news, weather, traffic, or social networking/social media information). Thus, by way of example and not limitation, events can include voice/video calls; email; SMS text messages; instant messages; notifications; social media or social networking news items or communications (e.g., tweets, Facebook posts or "likes", invitations, news feed items); news items relevant to the user; tasks that a user might address or respond to; RSS feed items; website and/or blog posts, comments, or updates; calendar events, reminders, or notifications; meeting requests or invitations; in-application communications including game notifications and messages, including those from other players; or the like. Some communication events may be associated with an entity (such as a contact or business, including in some instances the user himself or herself) or with a class of entities (such as close friends, work colleagues, boss, family, business establishments visited by the user, etc.).

User data may be received from a variety of sources where the data may be available in a variety of formats and received from one or more sensors. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user-data associated with events; etc.) including user activity that occurs over more than one user device, user history, session logs, application data, contacts data, calendar and schedule data, notification data, social-network data, news (including popular or trending items on search engines or social networks), online gaming data, ecommerce activity (including data from online accounts such as Amazon.com®, eBay®, PayPal®, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, Cellular network, or IP address data), and nearly any other source of data that may be sensed or determined as described herein. In some respects, user data may be provided in user signals. A user signal can be a feed of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources.

The event component 242 is generally responsible for monitoring events and related information in order to determine event patterns, event response information, and contextual information associated with events. For example, events and user responses to those events may be determined by monitoring user data, and from this, event patterns may be determined and unaddressed events detected.

In some embodiments, event component 242 may determine interpretive data from received user data. Interpretive data corresponds to data utilized by the event component 242 to interpret user data. For example, interpretive data can be used to provide context to user data, which can support determinations or inferences made by the subcomponents. Moreover, it is contemplated that event component 242 may use user data and/or user data in combination with interpretive data for carrying out the objectives of the subcomponents described herein.

The event component 242, in general, is responsible for determining event patterns. In some embodiments, event patterns may be determined by monitoring one or more variables related to events or user responses to those events. These monitored variables may be determined from the user data (for example: location, time/day, the initiator(s) or recipient(s) of a communication, the communication type (e.g., call, email, text, etc.), user device data, etc.). In particular, the variables may be determined from contextual data related to events. Thus, the variables can represent context similarities among multiple events. In this way, patterns may be identified by detecting variables in common over multiple events. More specifically, variables associated with a first event may be correlated with variables of a second event to identify in-common variables for determining a likely pattern. For example, where a first event comprises a user-initiated call to a contact identified as "mom" on Saturday and a second event comprises a user-initiated call to the same contact ("mom") on the following Saturday, a pattern may be determined that the user calls "mom" on Saturday. In this case, the in-common variables for the two events include the same contact-entity (mom), the same day (Saturday), that the communication was user-initiated, the same recipient of the communication (mom), and the same type or mode of communication (a call).

An identified pattern becomes stronger (i.e., more likely or more predictable) the more often the event instances that make up the pattern are repeated. Similarly, specific variables can become more strongly associated with a pattern as they are repeated. For example, suppose every day after 5 pm (after work) and while driving, a user calls someone in the same group of contacts (which could be her family members). While the specific person called varies (i.e., the contact-entity that the user calls), an event pattern exists because the user repeatedly calls someone in this group.

Event patterns do not necessarily include the same communication modes. For instance, one pattern may be that a user calls or emails his mom every Saturday. Moreover, in some instances, events pattern may evolve, such as where the user who calls his mom every Saturday starts to email his mom instead of calling her on some Saturdays, in which case the pattern becomes the user communicating with his mom on Saturdays. Event patterns may include event-related routines; typical user activity associated with events, or repeated event-related user activity that is associated with at least one in-common variable. For example, a particular user has a pattern of calling while driving but only after 5:30 pm or when the drive lasts longer than 10 minutes. Or a user is likely to browse the Internet and respond to personal email between 7:00 and 9:30 PM, but rarely after 9:30 PM. Further, in some embodiments, event patterns can include user response patterns to events.

Response information is determined by analyzing user data corresponding to events and user activity that occurs after a user becomes aware of an event, including after the user becomes aware of an unaddressed event (such as a missed call). The event component 242 analyzes this information in conjunction with the monitored event and determines a set of response information for the event. Based on response information determined over multiple events, the event component 242 can determine response patterns of particular users for certain events, based on contextual information associated with the event. The response to an event can be used to determine its urgency or importance to a user. For example, where monitored events include incoming emails from a user's boss, event component 242 may determine that the user responds to the email at the first available opportunity after the user becomes aware of the email. But where the monitored event includes a missed call from the user's wife, event component 242 may determine that the user typically returns her calls between 12 pm and 1 pm (i.e., at lunch) or after 5:30 pm (i.e., after work). Similarly, event component 242 may determine that a user responds to certain events only under certain conditions, such as when the user is at home, at work, in the car, in front of a computer, etc. In this way, event component 242 determines response information that includes user response patterns for particular events.

Moreover, most users behave or react differently to different contacts or entities. Events, such as a meeting or birthday party, may be associated with an entity or with a class of entities (e.g., close friends, work colleagues, boss, family, businesses frequented by the user such as a bank, etc.). Using contextual information, event component 242 may infer user response information for a user based on how that user responded to similar classes of entities, or how other users responded in similar circumstances (such as where in-common variables are present). Thus, for example, where a particular user receives a missed call from a new manager and has never responded to that manager before, event component 242 can consider how that user has previously responded to his other managers or how the user's colleagues (as other users in similar circumstances) have responded to that same manager or other managers.

The routine component 241 can determine whether the user is currently following an established routine or is outside of an established routine. A user routine, or a routine of a user, can correspond to recurring actions, or behavior patterns, of a user. In this respect, a routine may be defined in terms of one or more events that make up the routine. The routine component 241 can also be capable of determining or establishing routines in the first place. A determination of whether the user is currently following a routine can be communicated to the signal compaction component 250 for use in a model that determines whether the user data should be communicated. Also, services provided by the service provider can be tailored to out of routine events. Accordingly, information related to out of routine events may be more urgent than information related to routine events.

In certain respects, the present disclosure provides for the detection and tracking of one or more instances of events with respect to users, as described previously. The detected events can be analyzed with respect to one or more routines. For example, a routine may be identified as corresponding to a user based on patterns formed by detected events that make up the routine.

The routine component 241 can identify divergence between users and one or more routines of the users. A divergence between a user and a routine of the user may be identified by determining that one or more events that make up the routine are out of routine events. In some cases, an event may be out of routine for a routine where it is determined that a user will diverge from, has diverged from, or may diverge from the event with respect to the routine. In this regard, a divergence can correspond to a departure from a modeled pattern of detected events that form a routine.

In certain respects, routines may be analyzed based on accumulated user data that can indicate the occurrence of one or more instances routine events. Accumulated user data can comprise a collection of data that corresponds to a user. The user data may be continuously collected over time by a large variety of possible data sources and/or data systems that in aggregate forms a detailed record of patterns of user actions, that correspond to one or more routines of the user. These routines of the user can be identified, extracted, and/or analyzed from the accumulated user data at a level of scope, accuracy, and quantity that otherwise would not be achievable by the user alone.

The user benefit component 243 can make the determination whether one or more services provided by the user-experience component 260 would have a benefit to the user in the near future. The user benefit component 243 can assign a benefit score to one or more available services at the present time. The score for available services can change as the user context changes. The user benefit component 243 can take user data as input along with the user profile, record of upcoming events, and user routines. For example, a user that is driving through a shopping district may benefit from a task reminder function provided by the user-experience component 260 where the user typically has task reminders related to shopping. Conversely, the same user sitting at work might not benefit from a task reminder related to shopping. The user benefit can take the urgency determination made by urgency component 244 into account.

The urgency component 244 can evaluate the user context and assign an urgency score to one or more pieces of user data that has not yet been shared with the user-experience component 260. Different pieces of information can have a different urgency. The urgency can be related to known services provided by the user experience. For example, if the user-experience component 260 provides services related to upcoming meetings and events then information received about an upcoming event that will occur in the near future, for example, in the next 20 minutes, might be urgent. The same information received a day in advance of the event may receive less urgency. The urgency score can be calculated based on the amount of time between a time when the urgency score is being calculated and an event that is related to user data is scheduled to occur. The urgency score can take into account the importance of the event to the user. For example, a regularly scheduled work meeting that the user typically attends could contribute to a higher urgency score than a regularly scheduled work meeting that the user typically skips.

The importance of a portion of user information can be based on an event the information is associated with. Accordingly, the importance of an event may be determined to determine how urgent it is that information about the event be shared with a service provider. An importance level can indicate how important or imperative it is that a user addresses an event, while an urgency level may indicate how soon the event should be addressed. Some aspects of urgency component 244 may determine urgency, importance, or both. Moreover, a scheduled event may become more urgent as a deadline approaches, such as an anniversary, and the importance level and/or urgency level may be updated based on changes detected in contextual information, current user data, the user's response, newly detected user patterns, or new unaddressed events that are determined to be related to an already outstanding event. For example, a missed call from a boss following an unresponded-to email may indicate a higher urgency level for responding to the email.

In some embodiments, urgency component 244 determines an urgency level and/or importance level (which may be embodied as a score or numerical value) using information about the unaddressed event, which may be received from event component 242, along with user data or contextual information. For example, urgency component 244 may consider similar unaddressed events and their frequency (such as repeated missed calls or an unresponded-to email and missed call from the same contact); previous responses to similar events from the user or other users, which may indicate a level of importance or urgency, based on how soon after the similar unaddressed event occurred the user(s) responded; or pattern information such as whether the unaddressed event is associated with a pattern or whether it is unexpected.

In some embodiments, the urgency level or importance level may be determined from contextual information based on context features associated with the unaddressed event (including extracted keywords or other context features extracted from similar events). In particular, as described previously, keywords and other context features may be extracted to determine information about user responses for one or more users, such as information about how users typically respond (including how quickly they respond), based on certain keywords or other context features associated with the event. Additionally some keywords may be predetermined to indicate possible urgency (such as "urgent," "immediate," or similar words that may be present in communications).

In some embodiments, using the received information described in the preceding two paragraphs, a degree of urgency or importance may be determined for an event and used for determining a value representing the level of urgency or importance. For example, in an embodiment, the level of importance or urgency for an event may be determined relative to previous responses of the user or similar responses of other users, including handling events previously determined to be urgent or important or previously determined to be unimportant or not urgent. In this way, the determined level may span a range (such as 1 to 10 or "Not Urgent" to "Extremely Urgent," for example) based on a comparison to similar events and the extremes (urgent/important events and not urgent/important events) and how those events were handled. Further, in some embodiments, one or more thresholds may be applied for determining whether the determined urgency level value or importance level value is sufficient to result in communicating information about the event. For example, a user may desire not to be bothered by notifications (e.g., an exemplary service that could be provided by a service provider, such as user-experience component 260) corresponding to unaddressed events having low importance (such as a missed call from a random salesperson). Moreover, the threshold values may vary based on the device context and user context.

In some embodiments, an urgency level or importance level has an associated probability or confidence indicating a likelihood of the determined urgency or importance. The confidence may be determined based on the amount of contextual information potentially indicating urgency or importance and/or the magnitude (or weight) associated with specific pieces of contextual information. (For example, an email from the user's boss that is designated as a "high importance" message would have more weight than an email from the boss with normal importance.) In some embodiments, the confidence may be used for prioritizing communication of certain user data to a service.

The device-context component 245 can evaluate the device data 230 and assign a predefined device context profile that may be of use to the signal compaction component 250 or other components. Various device context profiles can be defined based on device variables that can help determine whether computer resources used to communicate user data are currently scarce. Scare resources can include data transfer availability, which can be related to the device's current connections (e.g., Wi-Fi, Ethernet, Data Plan) and power availability (e.g., plugged in or on battery, as well as available batter if on battery power). For example, the device could be assigned a context profile with unlimited power and unlimited bandwidth because the device is plugged into a power source and connected to a Wi-Fi network that does not have a data quota.

In general, device context profiles can be based on the presence or absence of a data quota and availability of power. On the one end, the context profile could indicate unlimited data transfer capability and unlimited power, as mentioned above. On the other end of the spectrum, the context profile could indicate very limited power and limited data transfer. In between, both power and data transfer availability can be measured on a scale. The power availability can be based on battery charge level if the device is not plugged in. The data transfer availability can be measured on a scale based on an amount of data left in the user's data quota. Other factors, such as the amount of active applications, which applications are active, device location, overall device power usage rate, estimated battery life as measured in a unit of time, could in isolation or combination be used to define a device context profile.

The user-context component 246 can analyze user data 210 along with other information to assign one or more user context profiles to the user given the current situation. The profiles can be thought of as a summary or conclusion based on the analysis of the user data, including changes over time. For example, the user data could show that the user is changing location at roughly 35 mph along the road. The device data could also indicate that the client device 205 has established a Bluetooth connection with the user's car. The user-context component 246 could then assign a user to context profile for "driving an automobile." The context profile can describe a broad activity and also have fields for more specific information about the activity. In this example, the "driving profile" could also include a proposed destination, estimated arrival time, and such. For example, a specific information could be a destination of the user's work place. Each field in the user context profile can have one or more variables that can be assigned with varying levels of confidence. Alternatively, various fields in a labeler context template can either be filled or left blank. The slots can be filled when the user data in combination with other information meets a criteria associated with a user context profile.

The signal user interface component 247 can provide an interface through which a user can see what types of user data has been shared or will be shared. The user can express preferences regarding what type of data can be shared. The user can also express a preference for one or more user experiences that can be used to determine the urgency of various types of user data in various scenarios. For example, user data that only enables a service the user is not interested in may be de-prioritized. In one aspect, the user can allocate a data quota to the sharing of user data with the user-experience component 260 on a connection with limited usage, such as a connection that is part of a data plan. This quota can be different from the quota available in the data plan. This user-defined quota can be used to determine whether information should be communicated at a given point in time.

The signal compaction component 250 determines what user data should be shared at a particular point in time, if any. The signal compaction component 250 can utilize one or more models that can be activated based on scenarios to analyze available user data and determine whether information should be shared at a point in time. If information is not shared at a first point in time, it may be held until a more appropriate time for sharing, such as when the user is plugged into a power source and connected to a network that does not have a data quota. The signal compaction component 250 includes a scenario component 252, a model store 253, a model selection component 254, and model execution component 255.

The scenario component 252 analyzes the user data 210, the device data 230, and outputs from the various components of the signal analysis component 240 to determine whether one or more user scenarios is currently applicable. The user scenarios can be matched to different models in the model store 253. The scenario can be passed to the model selection component 254, which in turn selects a model for execution by the model execution component 255. The various scenarios can include an in-routine scenario, an out of routine scenario, traveling on business scenario, a traveling on pleasure scenario, a late for an upcoming event scenario, a planning an event (e.g., travel, shopping, dining, entertainment), a commute scenario and such.

The scenario component 252 can use a classification system to assign the user to one or more scenarios. The classification system can be trained using labeled user data, device data, and signal analysis data that maps the data to a scenario. The classification system can then use user data 210, device data 230, and signal analysis data to assign the user to a scenario at a given point in time. In some instances, the user may not fall into any established scenarios. Even in routine and out of routine scenarios need not be binary. The user data could be ambiguous as to whether the user is clearly out of routine or in routine with minor variations. This can be the case where few signals are available for analysis.

The scenario component 252 can also use various heuristics to determine when the scenario is active. The heuristics define one or more variables that when present can positively contribute towards a determination that a scenario is active or conversely that a scenario is not active. The variables in a heuristic may be given different weights so that some variables play a larger role in determining whether a scenario is ongoing.

The model execution component 255 executes a selected model to determine whether data should be shared at a given point in time. The model execution component 255 can use machine learning models to make this determination. Heuristic models can also be used. The model execution component 255 can take any available user data 210, device data 230, and signal analysis data along with user profile data to determine whether information should be shared. The goal of the model is to balance the importance and urgency of the various piece of information against a cost of using scarce resources to communicate the information.

In one heuristic approach, the model starts with a default frequency of user data communication and a default content definition. The content definition defines what or how much user data will be communicated. The content definition can be adjusted to communicate less information, for example only urgent information. The first step can be to determine a device context profile, as described previously. With some context device profiles, no change is made to the default frequency or content definition. With other contexts, the frequency is reduced and content definition changed. For example, when the battery is running low the sharing frequency may be reduced. With still other device context profiles the frequency of transmission or amount of data could be increased, for example when the user device is plugged into a power outlet and connected to transmission means with no data quota. As described subsequently, the amount of adjustment could vary depending on an active model. For example, the change in frequency could differ between the regular model and a scenario-specific model.

The second step can be to determine a user context profile and adjust the frequency and content definition for data to be sent. The adjustments made based on user context can be made to whatever frequency and content definition was determined appropriate based on the device context. Thus, the default rate could be adjusted or an already adjusted rate could be further adjusted. In one aspect, the adjustment is a percentage increase or decrease. In another aspect, the adjustment is setting the frequency and content definition according to a preset frequency without regard to the previous default frequency or content definition.

The model can also determine the granularity with which information should be shared by adjusting the content definition. For example, when the user is in a "late for an event" scenario location information may be deemed very important and urgent. Thus, the content definition in the "late for event" scenario can prioritize transmission of location content over other types of contextual data. Additionally, email or text correspondence related to the event could also be important. However, given a scarcity of resources as indicated by limited battery power or data quota the model may choose to show an average location periodically rather than each location data point. Similarly, snippets of relevant correspondence or other derivative information taken from the correspondence may be shared rather than the entire correspondence. The content shared is defined by the active content definition.

The model can also determine how frequently the signal compaction component 250 makes an evaluation regarding what data to share. For example, when a user is following a routine where available user experiences are not typically needed for a period of time (e.g., the user is asleep or at work), then the model can set the next determination to be triggered based on the routine component 241 making a determination that the user is out of routine. Alternatively, the signal compaction component 250 could suggest a new determination be made within a threshold period of time of the user attending the current portion of the routine where user experiences are not likely to be needed.

The model may be set to default frequency of transmission and a default amount of transmission. The default frequency of data transmission could be twice an hour. As the model determines an urgent use for data may be present, then the frequency could increase. Similarly, the amount or types of user data transmitted could start with a default. The model could determine that less data should be transmitted based on a limited amount of data in a data quota or some other device context. In the case where limited data is to be sent, the model can determine that only information related to service with an urgent need is communicated.

Continuing with FIG. 2, user-data collection component 261 is generally responsible for accessing or receiving (and in some cases also identifying) user data from one or more data sources, such as data sources 104a and 104b through 104n of FIG. 1. In some embodiments, user-data collection component 261 may be employed to facilitate the accumulation of user data of a particular user (or in some cases, a plurality of users including crowd-sourced data) for experience component 264, which provides one or more services to a user. The data may be received (or accessed), and optionally accumulated, reformatted and/or combined, by data collection component 261 and stored in one or more data stores, where it may be available to other components of system 200. For example, the user data may be stored in or associated with a user profile 265, as described herein. In some embodiments, any personally identifying data (i.e. user data that specifically identifies particular users) is either not uploaded or otherwise provided from the one or more data sources with user data, is not permanently stored, and/or is not made available to various services.

In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 261 receives or accesses data continuously, periodically, or as needed.

Features extractor 262 is generally responsible for determining event-related features (or variables) associated with an event that may be used for identifying patterns of user events that can form routines. Event features may be determined from information about an event and/or from related contextual information. In some embodiments, features extractor 262 receives user data and analyzes the received information to determine a set of zero or more features associated with an event. Common features for different events can be used to help establish an event pattern.

The user model 263 can analyze user data and update the user profile 265 with changes that result from new data. The profile information can include user interests, user relations, a home location, a work location, account information, social relationships, family relationships, work relationships, and such. The user profile can include event records, event patterns, responses to user services, and other information related to user preferences to receive services in a given context.

The experience component 265 can provide one or more experiences based on contextual information provided by the client device. The experiences can help users complete tasks by providing reminders, providing directions, providing suggestions, or similar.

Figure 3:
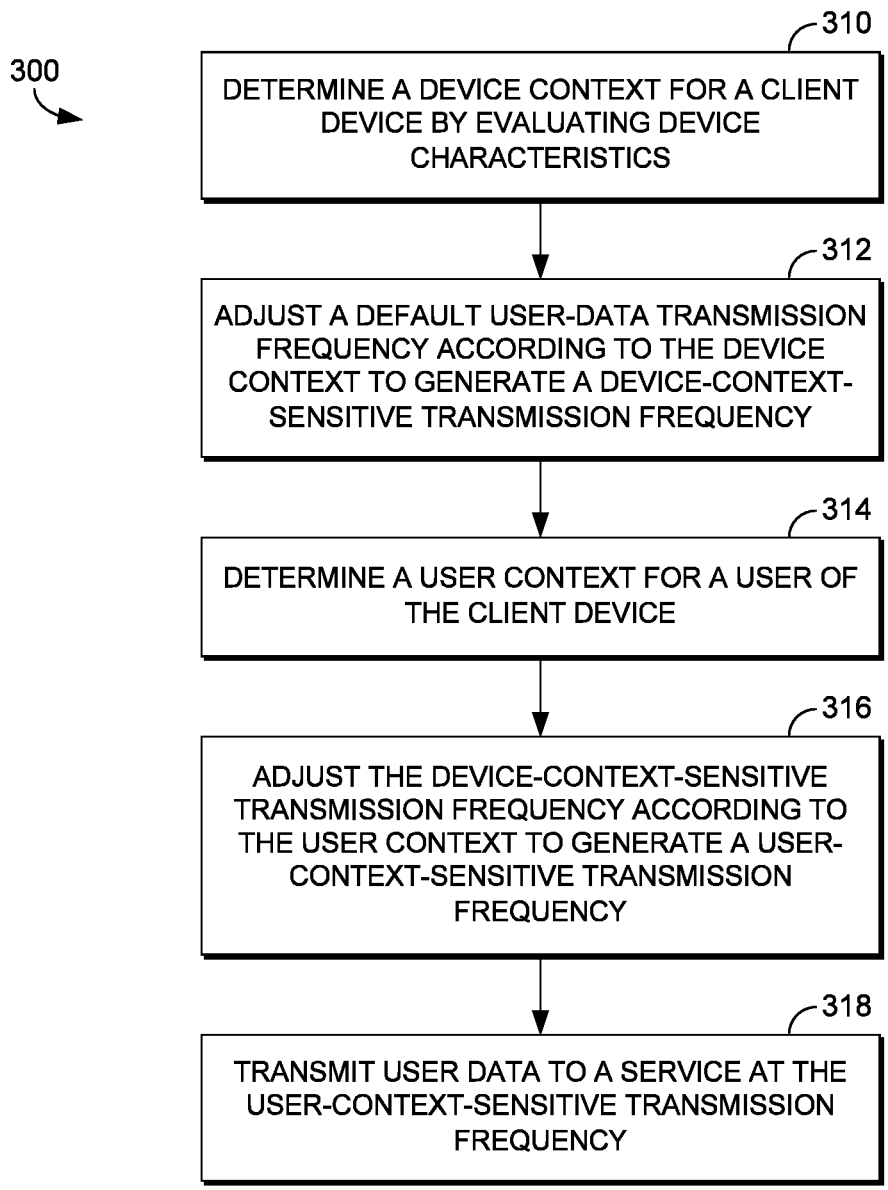
FIGS. 3-5 are flow diagrams showing additional exemplary methods of signal compaction, in accordance with an aspect of the technology described herein.

Turning now to FIG. 3, a method 300 of signal compaction is provided according to an aspect of the present technology. The method 300 can be performed by a client device to determine how frequently and what user data may be transmitted from the client device to another device, such as a user-experience component. In one aspect, the user-experience component is a personal assistant server.

At step 310, a device context for a client device is determined by evaluating device characteristics. The device context and relevant device characteristics have been described previously with reference to the FIG. 2. The device context could be assigned a profile defined by various device characteristics. For example, a series of profiles may be relevant when the client device is running on battery power. Different profiles can be based on different levels of energy remaining in the battery. Another set of profiles, could be based on whether an active data link over which user data will be transmitted has a data quota. More granular profiles could be based on an amount of data left in the quota. As an example, when a device context profile that is associated with a reduced frequency of transmission is active, the default frequency of user data transmission will be reduced to what can be described as a device-context-specific transmission rate. The content definition could be adjusted in a similar fashion to transmit less content with each transmission. The definition is adjusted to make sure the most important or urgent user data is transmitted.

At step 312, a default user-data transmission frequency is adjusted according to the device context to generate a device-context-sensitive transmission frequency. For example, the default frequency of two times an hour could be adjusted to once an hour. The default frequency may be decreased when computing resources on the client device are scarce. Exemplary computing resources include battery power in available data transmission. The device-context sensitive transmission frequency only takes device context into account. For example, all else being equal, the device-context sensitive transmission frequency could be reduced when the battery power is low or a data quota is imposed on a device.

At step 314, a user context is determined for a user of the client device. The user context and relevant device characteristics have been described previously with reference to the FIG. 2. As an example, a user context could indicate that the user is out of routine. When the user is out of routine, one or more services enabled by the provision of user data could be of significant benefit to the user. As with the device context, user data can be evaluated to assign a user context profile to the user at a point in time. The profile can dictate whether the active transmission frequency is increased or decreased. The increase or decrease can be by a discrete amount or percentage.

At step 316, the device-context-sensitive transmission frequency is adjusted according to the user context to generate a user-context-sensitive transmission frequency. For example, the frequency could be adjusted from one to have an hour to four times an hour.

At step 318, user data is transmitted to a service at the user-context-sensitive transmission frequency.

Figure 4:
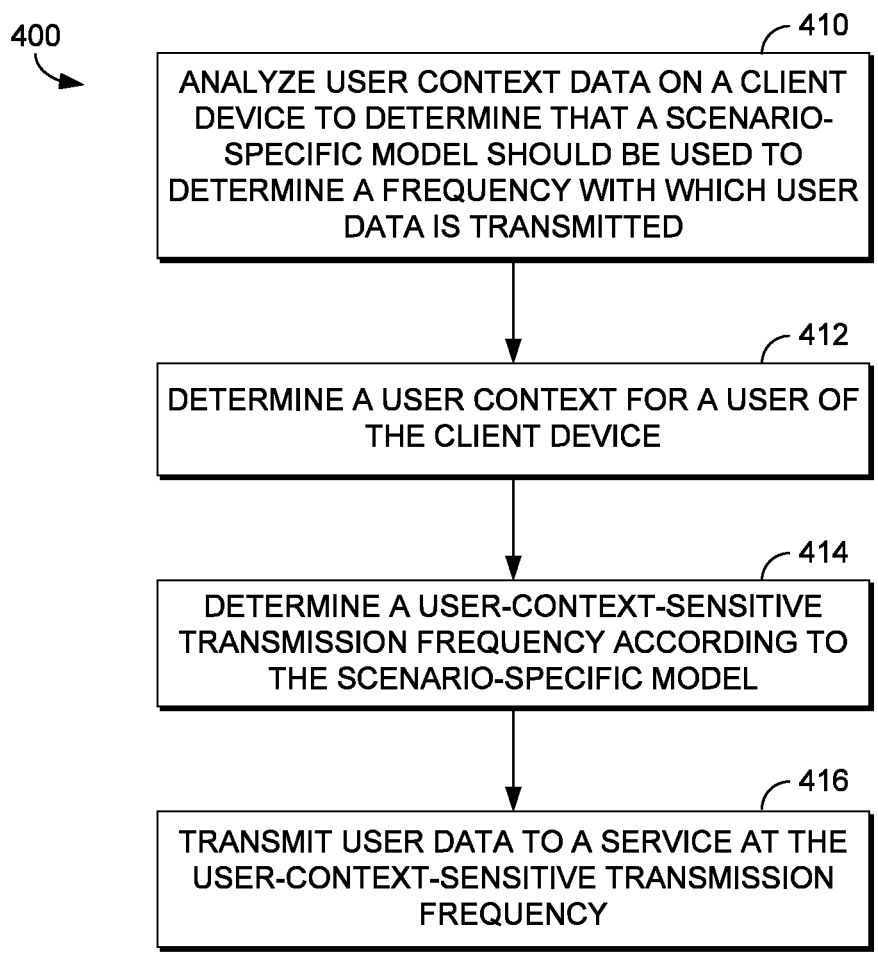

Turning now to FIG. 4, a method 400 of signal compaction is provided according to an aspect of the present technology. The method 400 can be performed by a client device to determine how frequently and what user data may be transmitted from the client device to another device, such as a user-experience component. In one aspect, the user-experience component is a personal assistant server.

At step 410, user context data is analyzed on a client device to determine that a scenario-specific model should be used to determine a frequency with which user data is transmitted. Various heuristics can be used to determine when a scenario is active. The heuristics define one or more variables that indicate that a scenario is active or conversely that a scenario is not active. The variables in a heuristic may be given different weights so that some variables play a larger role in determining whether a scenario is ongoing. The various scenarios can include an in-routine scenario, an out of routine scenario, traveling on business scenario, a traveling on pleasure scenario, a late for an upcoming event scenario, a planning an event (e.g., travel, shopping, dining, entertainment), a commute scenario and such.

At step 412, a user context is determined for a user of the client device. The user context and relevant device characteristics have been described previously with reference to the FIG. 2. As an example, a user context could indicate that the user is out of routine. When the user is out of routine, one or more services enabled by the provision of user data could be of significant benefit to the user. As with the device context, user data can be evaluated to assign a user context profile to the user at a point in time. The profile can dictate whether the active transmission frequency is increased or decreased. The increase or decrease can be by a discrete amount or percentage.

At step 414, a user-context-sensitive transmission frequency is determined according to the scenario-specific model. The transmission frequency determined according to the scenario specific model can differ from the frequency determined by a normal or default model.

At step 416, user data is transmitted to a service at the user-context-sensitive transmission frequency.

Figure 5:
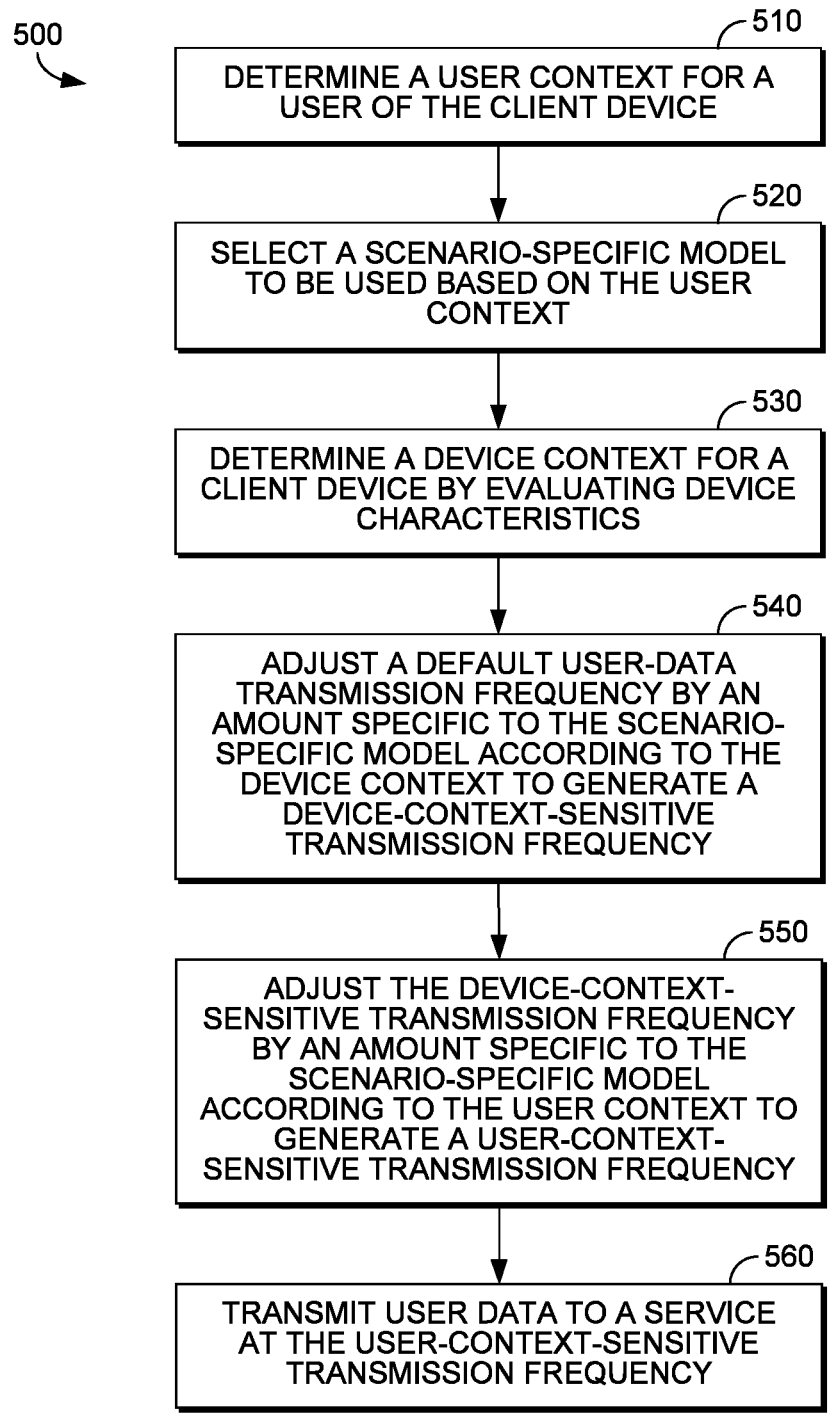

Turning now to FIG. 5, a method 500 of signal compaction is provided according to an aspect of the present technology. The method 500 can be performed by a client device to determine how frequently and what user data may be transmitted from the client device to another device, such as a user-experience component. In one aspect, the user-experience component is a personal assistant server.

At step 510, a user context for a user of the client device is determined. The user context and relevant device characteristics have been described previously with reference to the FIG. 2.

At step 512, a scenario-specific model is selected to be used based on the user context. Various heuristics can be used to determine when a scenario is active. The heuristics define one or more variables that indicate that a scenario is active or conversely that a scenario is not active. The variables in a heuristic may be given different weights so that some variables play a larger role in determining whether a scenario is ongoing. The various scenarios can include an in-routine scenario, an out of routine scenario, traveling on business scenario, a traveling on pleasure scenario, a late for an upcoming event scenario, a planning an event (e.g., travel, shopping, dining, entertainment), a commute scenario and such.

At step 514, a device context is determined for a client device by evaluating device characteristics. The device context and relevant device characteristics have been described previously with reference to the FIG. 2.

At step 516, a default user-data transmission frequency is adjusted by an amount specific to the scenario-specific model according to the device context to generate a device-context-sensitive transmission frequency. The device-context-sensitive transmission frequency takes only the device-context, such as battery charge, into account in view of the scenario-specific model, which prioritizes some transmissions over others. Specifically, the scenario-specific model prioritizes transmissions of data that are relevant to the current scenario over data that is not related. For example, during a navigation scenario location data may be prioritized over communications, unless the communications are related to the navigation.

At step 518, the device-context-sensitive transmission frequency is adjusted by an amount specific to the scenario-specific model according to the user context to generate a user-context-sensitive transmission frequency. The user-context-sensitive transmission frequency adjusts the device-context-sensitive transmission frequency upward or downward based on user context. Thus, the user-context-sensitive transmission frequency takes both the device context and user context into account along with the active scenario.

At step 520, user data is transmitted to a service at the user-context-sensitive transmission frequency.

Exemplary Operating Environment

Figure 6:
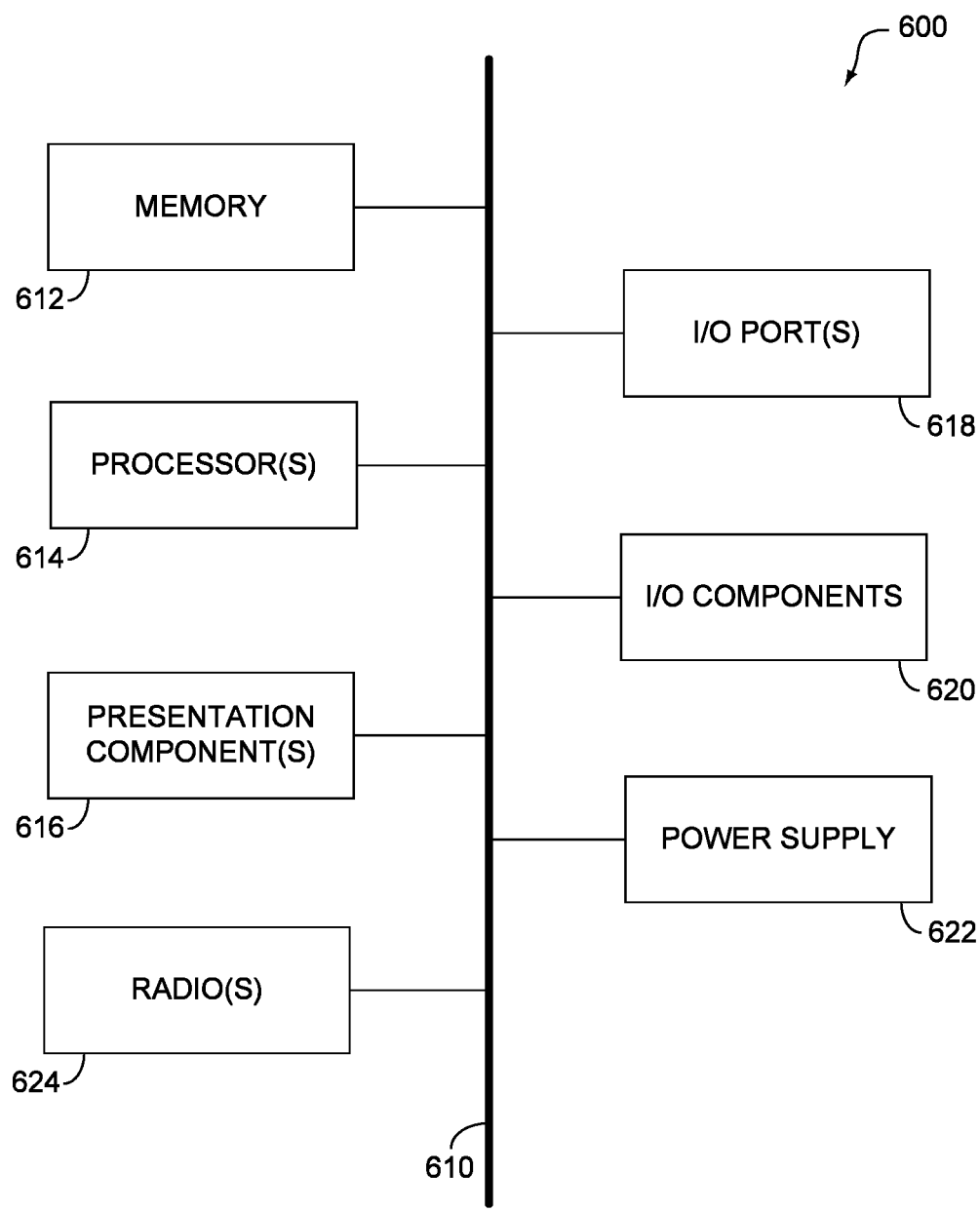
FIG. 6 is a block diagram of an exemplary computing environment suitable for use in implementing aspects of the technology described herein.

Referring to the drawings in general, and initially to FIG. 6 in particular, an exemplary operating environment for implementing aspects of the technology described herein is shown and designated generally as computing device 600. Computing device 600 is but one example of a suitable computing environment and is not intended to suggest any limitation as to the scope of use of the technology described herein. Neither should the computing device 600 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 6, computing device 600 includes a bus 610 that directly or indirectly couples the following devices: memory 612, one or more processors 614, one or more presentation components 616, input/output (I/O) ports 618, I/O components 620, and an illustrative power supply 622. Bus 610 represents what may be one or more busses (such as an address bus, data bus, or a combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer storage media in the form of volatile and/or nonvolatile memory. The memory 612 may be removable, non-removable, or a combination thereof. Exemplary memory includes solid-state memory, hard drives, optical-disc drives, etc. Computing device 600 includes one or more processors 614 that read data from various entities such as bus 610, memory 612, or I/O components 620. Presentation component(s) 616 present data indications to a user or other device. Exemplary presentation components 616 include a display device, speaker, printing component, vibrating component, etc. I/O ports 618 allow computing device 600 to be logically coupled to other devices, including I/O components 620, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 614 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 600. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

A computing device may include a radio 624. The radio 624 transmits and receives radio communications. The computing device may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. A method comprising:
providing a scenario-specific model for user data transmission when a user of a client device is running late for scheduled events; and
in a particular instance:
making a determination that the user of the client device is running late for a particular scheduled event based at least on user context data on the client device;
determining that the scenario-specific model is applicable in the particular instance based at least on the determination that the user of the client device is running late for the particular scheduled event;
determining a user-context-sensitive transmission frequency to apply in the particular instance based at least on the scenario-specific model being applicable in the particular instance; and
transmitting user data to a service at the user-context-sensitive transmission frequency, the user-contextsensitive transmission frequency being increased relative to a default user data transmission frequency.

2. The method of claim 1, further comprising:
determining urgency for one or more items of user data; and
selecting the one or more items of user data to transmit to the service based at least on the urgency.

3. The method of claim 1, further comprising:
determining a gain to the user for a portion of user data that enables the service to be provided to the user, wherein the gain is based on a user's previous response to the service.

4. The method of claim 1, wherein the user data identifies an average location of the client device.

5. The method of claim 1, wherein content related to the particular scheduled event is selected for transmission as part of the user data.

6. The method of claim 1, wherein the default user data transmission frequency is at least twice per hour and the user-context-sensitive transmission frequency is at least four times per hour.

7. The method of claim 1, wherein the user context data used to determine that the user is running late includes a calendar entry associated with the user.

8. The method of claim 1, wherein the user context data used to determine that the user is running late includes an email relating to the particular scheduled event.

9. A method comprising:
determining a user routine of a user of a client device based at least on the user having engaged in a pattern of user actions on multiple previous occasions;
providing a scenario-specific model for user data transmission when the user of the client device engages in new patterns of user actions that do not match the user routine; and
in a particular instance:
making a determination, based on user context data on the client device, that the user is engaged in a particular new pattern of user actions that does not match the user routine;
determining that the scenario-specific model is applicable in the particular instance based at least on the determination that the user is engaged in the particular new pattern of user actions that does not match the user routine;
determining a user-context-sensitive transmission frequency to apply in the particular instance based at least on the scenario-specific model being applicable in the particular instance; and
transmitting user data to a service at the user-context-sensitive transmission frequency, the user-context-sensitive transmission frequency being increased relative to a default user data transmission frequency.

10. The method of claim 9, further comprising:
determining urgency for one or more items of user data; and
selecting the one or more items of user data to transmit to the service based at least on the urgency.

11. The method of claim 9, further comprising:
determining a gain to the user for a portion of user data that enables the service to be provided to the user, wherein the gain is based on a user's previous response to the service.

12. The method of claim 9, wherein the default user data transmission frequency is at least twice per hour.

13. The method of claim 9, wherein content related to a scheduled event is selected for transmission as part of the user data.

14. The method of claim 9, wherein the user data includes location data identifying a location of the client device.

15. The method of claim 9, wherein the user-context-sensitive transmission frequency is at least twice the default user data transmission frequency.

16. The method of claim 9, wherein the pattern of user actions of the user routine includes input provided by the user to the client device on the multiple previous occasions.

17. One or more hardware computer storage media comprising instructions embodied thereon which, when executed by a computing device, cause the computing device to perform acts comprising:
determining a user routine of a user based at least on the user having engaged in a pattern of user actions on multiple previous occasions;
providing a scenario-specific model for user data transmission when the user engages in new patterns of user actions that do not match the user routine; and
in a particular instance:
making an explicit determination, based on user context data for the user, that the user is engaged in a particular new pattern of user actions that does not match the user routine;
determining that the scenario-specific model is applicable in the particular instance based at least on the explicit determination that the user is engaged in the particular new pattern of user actions that does not match the user routine;
determining a user-context-sensitive transmission frequency to apply in the particular instance based at least on the scenario-specific model being applicable in the particular instance; and
transmitting user data to a service at the user-context-sensitive transmission frequency, the user-context-sensitive transmission frequency being increased relative to a default user data transmission frequency at which other user data is transmitted to the service in other instances.

18. The one or more hardware computer storage media of claim 17, the acts further comprising:
determining a device context by evaluating device characteristics, wherein the user-context-sensitive transmission frequency takes the device context into account.

19. The one or more hardware computer storage media of claim 17, the acts further comprising:
determining urgency for one or more items of user data; and
selecting the one or more items of user data to transmit to the service based at least on the urgency.

20. The one or more hardware computer storage media of claim 17, the acts further comprising:
determining a gain to the user for a portion of user data that enables the service to be provided to the user, wherein the gain is based on a user's previous response to the service.

21. The one or more hardware computer storage media of claim 17, wherein the user-context-sensitive transmission frequency is at least twice the default user data transmission frequency and at least four times per hour.

22. The one or more hardware computer storage media of claim 21, wherein content related to a scheduled event is selected for transmission as part of the user data.

* * * * *